United States Patent [15] 3,652,799

Thomas [45] Mar. 28, 1972

[54] FRAME SYNCHRONIZATION SYSTEM

[72] Inventor: David M. Thomas, Bayshore, Ottawa, Canada

[73] Assignee: International Standard Electric Corporation, New York, N.Y.

[22] Filed: Sept. 29, 1970

[21] Appl. No.: 76,407

[30] Foreign Application Priority Data

Sept. 30, 1969 Great Britain ....................48,096/69

[52] U.S. Cl. ....................................179/15 BS, 178/69.5 R
[51] Int. Cl. ....................................................H04j 3/06
[58] Field of Search ..........................179/15 BS; 178/69.5 R

[56] References Cited

UNITED STATES PATENTS 3,484,555 12/1969 Ching..............................179/15 BS

*Primary Examiner*—Ralph D. Blakeslee
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An incoming TDM bit stream, containing synchronization signals in one or more time positions of each TDM frame is monitored by a first circuit to test the stream synchronization signal versus local synchronization signal. While this is in progress a second circuit looks for the stream synchronization signal in bit stream. If the first circuit shows that synchronization is O.K., then there is no change. However, if the first circuit shows that synchronization is lost, then the synchronization signal detected by the second circuit is used as a new local synchronization signal. The concurrent operation of the first and second circuit enables rapid resynchronization when synchronization is lost.

10 Claims, 1 Drawing Figure

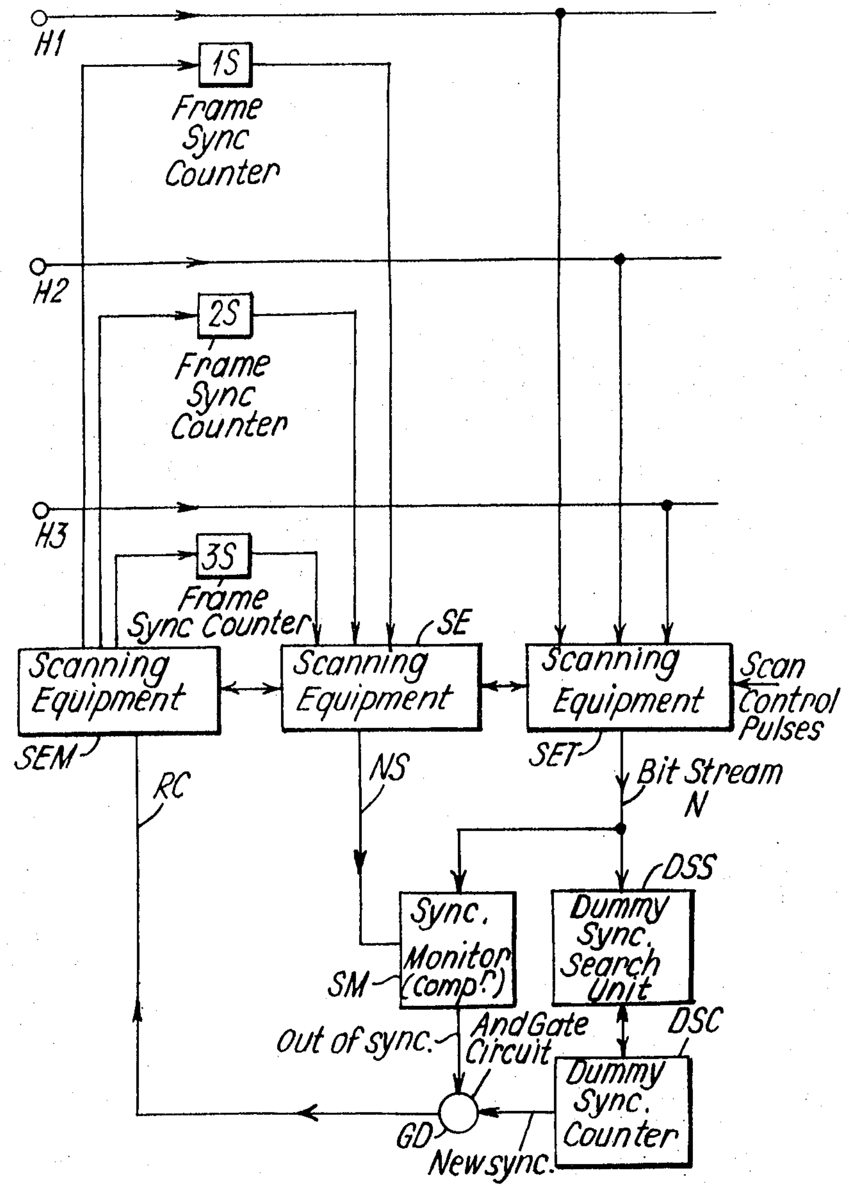
Inventor
DAVID M. THOMAS
By Alfred C. Hill
Agent

FRAME SYNCHRONIZATION SYSTEM

BACKGROUND OF THE INVENTION

This invention relates to time division multiplex (TDM) systems, and especially to frame synchronization in such systems.

In such systems using framed digital bit streams receiving equipment has to be synchronized to the framing of the bit stream. In the case of a multiplexed group of communication channels, it is necessary to know the time at which particular channels occur, so equipment is needed to obtain this synchronization, using synchronizing patterns in the framed bit stream. In the case of a PCM system, such a synchronization pattern can be provided by using one channel in the frame as a synchronization channel, to which a special code pattern is allotted. For a TDM system with one bit per frame for each channel, again one channel can be used for synchronization, the channel conveying a synchronization combination spread over a number of successive frames. Such a special code can be a "comma-free" or distributed combination, i.e., a combination such as 0110110 110110 110110 . . . which repeats endlessly.

When synchronization has been obtained it is necessary to monitor the synchronization time position (or time positions if there are more than one in the frame) so as to be able to recognize when synchronization is lost, e.g., due to a phase shift at the transmitter, or bit slippage due to frequency difference between the incoming bit stream and the local clock, and then if synchronization is lost to effect resynchronization. The criteria for these operations differ, the persistence check used in the monitoring for the determination of loss of synchronization being typically longer than the time spent on the resynchronization search.

SUMMARY OF THE INVENTION

The present invention seeks to enable a resynchronization to be made more quickly than is the case in many known systems.

A feature of this invention is the provision of a frame synchronization system for a TDM system in which one or more preselected time positions in a TDM signal frame are used for conveying a synchronization signal comprising at least one source of the TDM signal; first means to store locally the synchronization signal; second means coupled to the source and the first means to determine whether frame synchronization is being maintained and to produce a control signal when the frame synchronization is lost; third means coupled to the source to simultaneously detect the synchronization signal in the multiplex signal; and fourth means coupled to the second means, the third means and the first means responsive to the control signal to substitute the synchronization signal detected by the third means in the first means for the synchronization signal being operated on by the second means.

According to the present invention there is provided a time division multiplex transmission system in which one or more preselected time positions in the time frame are used for conveying synchronization signals, in which at a receiving station the incoming bit stream is monitored to ascertain whether synchronization is being maintained between said bit stream and the local clock, in which at the same time as said monitoring is performed test means tests the incoming bit stream to search for the synchronization information therein, in which if said bit stream is in proper synchronism with the local clock the new synchronization as detected by said test means and the current synchronization are the same, in which if said bit stream and said local clock lose synchronization the new synchronization as obtained by said test means differs from the current synchronization and in which the detection of said difference causes the current synchronization to be replaced by said new synchronization.

Thus, it will be seen that the operation of looking for a lack of synchronization, and for resynchronizing are performed in parallel, and not sequentially, with a consequent saving in time and, hence, with less loss of information.

BRIEF DESCRIPTION OF THE DRAWING

The above-mentioned and other features and objects of this invention will become more apparent by reference to the following description taken in conjunction with the accompanying drawings, in which the sole FIGURE is a block diagram of part of a receiving station for several multiplex highways over each of which a framed bit stream may be received.

DESCRIPTION OF THE PREFERRED EMBODIMENT

This invention is especially advantageous in the multiplex arrangement illustrated where much of the synchronizing equipment is itself time shared among the bit streams served.

The bit streams dealt with arrive over highways H1, H2, H3, and each bit stream highway has a frame synchronization counter S, these binary counters 1S, 2S, 3S respectively serving the highways H1, H2, H3. The settings of these counters indicate the current or local synchronization condition or signal of the highways to which they correspond. They and the highways are scanned by scanning equipment SE, SEM and SET, such that each counter and its highway are scanned at the same time. This scanning is effected under control of scan control pulses derived from the local clock.

During each scan, each counter and its highway are examined long enough for a synchronization monitoring operation to be performed. The duration of this monitoring operation depends on the synchronization pattern and also on the criteria used for detecting a lack of synchronization. The result of the scan of these counters is sent over the connection NS to a synchronization monitor SM, which also receives the bit stream being monitored from the scanning equipment SET. If this monitor SM finds a lack of synchronization, an output is delivered to a gating device GD, such as an AND GATE.

Monitor SM includes a digital comparison circuit, such as an EXCLUSIVE OR gate for one bit synchronization code, or an identical shift register and an AND gate matrix decoder for each input coupled to monitor SM with an NAND gate connected to the two matrix decoders to produce an output when there is lack of synchronization between the codes present in the shift registers.

The bit stream from the highway being scanned by the scanning equipment SET is also sent to a dummy synchronization search unit DSS, which continuously searches for the synchronization code, and when it finds it, it resets a dummy synchronization counter DSC. Thus, during each scan, the binary counter DSC is set in accordance with the r result of the synchronization search by the unit DSS.

The search unit DSS includes, in the case of a standard PCM system, a detection circuit which is connected via gates to a staticizer in which each PCM code is temporarily stored. When a synchronization code is present, the gates are all enabled to operate an indication device such as a bistable. This bistable then delivers an output pulse to the dummy sync. counter DSC. The latter is a relatively simple unit, e.g., one or more integrated circuit units such as can be obtained from several manufacturers. Where the TDM system has one bit per frame for each channel the storage in DSS can accommodate a number of bits, and is controlled so that one bit from each of several successive frames is monitored.

If at the end of the monitor period, an out of synchronization condition has been detected, the application of the out of synchronization signal to the device GD (which in the case of parallel signal transmission could be a multiple AND gate unit) causes, over the connection RC to the scanning equipment SEM, the resetting of the frame synchronization counter for the highway being dealt with. This resetting is accompanied by the transfer of new synchronization information from DSC via GD, RC and SEM to the appropriate one of the S counters. Hence, the scanning equipment can step immediately to the next highway and its bit stream.

Thus, the time required to examine one bit stream is equal to either the apparatus, needed to monitor the synchronization or the time required to obtain a new synchronization, whichever time is longer. As these times are usually comparable, this means that one highway and its bit stream can be dealt with in approximately half the time needed if a new synchronization search is not initiated until an out of synchronization indication is given. Thus, time shared equipment can serve approximately twice as many bit streams, or the same number of bit streams can be dealt with in about half the time.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frame synchronization system for a time division multiplex system in which one or more preselcted time positions in a time division multiplex signal frame are used for conveying a synchronization signal comprising:

at least one source of said time division multiplex signal;

first means to store locally said synchronization signal;

second means coupled to said source and said first means to determine whether frame synchronization is being maintained and to produce a control signal when said frame synchronization is lost;

third means coupled to said source to simultaneously detect said synchronization signal in said multiplex signal; and fourth means coupled to said second means, said third means and said first means responsive to said control signal to substitute said synchronization signal detected by said third means in said first means for said synchronization signal being operated on by said second means.

2. A synchronization system according to claim 1, wherein said first means includes a binary counter to store said synchronization signal.

3. A synchronization system according to claim 1, wherein said second means includes a digital comparison means coupled to said first means and said source.

4. A synchronization system according to claim 1, wherein said third means includes a binary counter to store said synchronization signal detected in said multiplex signal.

5. A synchronization system according to claim 1, wherein said fourth means includes at least one AND gate enabled by said control signal.

6. A synchronization system according to claim 1, wherein said first means includes a first binary counter to store said synchronization signal;

said second means includes a digital comparison means coupled to said first counter and said source;

said third means includes a second binary counter to store said synchronization signal detected in said multiplex signal; and said fourth means includes at least one AND gate having its inputs coupled to said comparison means and said second counter and its output coupled to said first counter.

7. A synchronization system according to claim 1, further including a plurality of sources;

a plurality of first means each associated with a different one of said plurality of sources; and fifth means to couple said second means, said third means and said fourth means sequentially to each of said plurality of sources and the associated one of said plurality of first means.

8. A synchronization system according to claim 7, wherein each of said first means includes a binary counter to store said synchronization signal of each of the associated one of said plurality of sources.

9. A synchronization system according to claim 7, wherein said second means includes a digital comparison means coupled sequentially to each of said plurality of first means and the associated one of said plurality of sources.

10. A synchronization system according to claim 1, wherein said third means includes a binary counter to store said synchronization signal detected in said multiplex signal; and said fourth means includes at least one AND gate coupled to said counter and said second means responsive to said control signal to couple said stored synchronization signal to said first means to replace said synchronization signal present therein.

* * * * *